(12) United States Patent
Hoffner et al.

(10) Patent No.: US 10,904,192 B2
(45) Date of Patent: Jan. 26, 2021

(54) TIME SERIES MESSAGING PERSISTENCE AND PUBLICATION

(71) Applicant: SAP SE, Walldorf (DE)

(72) Inventors: Andreas Hoffner, Ostringen (DE); Martin Bachmann, Heidelberg (DE)

(73) Assignee: SAP SE, Walldorf (DE)

( * ) Notice: Subject to any disclaimer, the term of this patent is extended or adjusted under 35 U.S.C. 154(b) by 159 days.

(21) Appl. No.: 15/220,587

(22) Filed: Jul. 27, 2016

(65) Prior Publication Data

US 2018/0034760 A1 Feb. 1, 2018

(51) Int. Cl.
*H04L 12/58* (2006.01)

(52) U.S. Cl.
CPC ............. *H04L 51/18* (2013.01); *H04L 51/10* (2013.01); *H04L 51/34* (2013.01)

(58) Field of Classification Search
CPC ... H04L 51/18; H04L 9/3297; H04N 21/8547; G06F 16/2322
USPC ........................................................ 709/206
See application file for complete search history.

(56) References Cited

U.S. PATENT DOCUMENTS

| | | | |
|---|---|---|---|
| 9,146,802 B2 | 9/2015 | Tran et al. | |
| 9,330,726 B1 * | 5/2016 | Lawson | G11B 27/34 |
| 9,454,993 B1 * | 9/2016 | Lawson | G11B 27/102 |
| 9,804,588 B2 * | 10/2017 | Blevins | G05B 19/4184 |
| 2002/0041284 A1 * | 4/2002 | Konishi | A63B 71/0622 |
| | | | 345/473 |
| 2004/0098358 A1 | 5/2004 | Roediger | |
| 2008/0126980 A1 | 5/2008 | Bachmann et al. | |
| 2010/0048187 A1 * | 2/2010 | Sullivan | H04N 21/2187 |
| | | | 455/414.3 |
| 2010/0332262 A1 | 12/2010 | Horvitz et al. | |
| 2011/0016214 A1 | 1/2011 | Jackson | |
| 2011/0035187 A1 | 2/2011 | Dejori | |
| 2014/0250153 A1 * | 9/2014 | Nixon | G05B 15/02 |
| | | | 707/812 |
| 2014/0359552 A1 | 12/2014 | Misra | |
| 2014/0372427 A1 | 12/2014 | Lehmann | |

(Continued)

OTHER PUBLICATIONS

Communication dated from EPO re European Search report dated Jun. 21, 2017 for EP Application No. 16002495.6-1862 (10 pages).

(Continued)

*Primary Examiner* — Kevin T Bates
*Assistant Examiner* — Emad Siddiqi
(74) *Attorney, Agent, or Firm* — Fish & Richardson P.C.

(57) ABSTRACT

Techniques are described for time series based enrichment of messages that are persisted and published in a flow according to the time series data. Inbound messages may be received and processed to add timing information. The modified messages may be stored as a time series in data storage. In response to a request for a particular sequence or set of messages, the messages may be retrieved from data storage and provided in a flow instance to the requestor. The requestor, such as a consumer application, may replay the data from the messages according to the order of the time series of the messages. In this way, implementations enable a time ordered sequence of messages to be replayed at any time after the initial receipt of the messages, and enable any number of instances of such replay including simultaneous replay of a particular message sequence to multiple consumers.

20 Claims, 7 Drawing Sheets

(56) References Cited

U.S. PATENT DOCUMENTS

| | | |
|---|---|---|
| 2016/0065417 A1 | 3/2016 | Sapuram et al. |
| 2016/0112524 A1* | 4/2016 | Sutou .................. H04N 21/858 |
| | | 709/206 |
| 2016/0226955 A1 | 8/2016 | Moorthi et al. |
| 2016/0291826 A1 | 10/2016 | Verzano |
| 2016/0359664 A1 | 12/2016 | Malegaonkar |
| 2017/0063709 A1 | 3/2017 | Smith |
| 2017/0220616 A1* | 8/2017 | Foster ............... G06F 16/24568 |
| 2017/0300598 A1 | 10/2017 | Akavia |
| 2017/0331887 A1 | 11/2017 | Fishler |
| 2018/0123967 A1 | 5/2018 | Kinarti et al. |

OTHER PUBLICATIONS

U.S. Office Action (Non-final) in U.S. Appl. No. 15/342,416, dated Oct. 9, 2018, 21 pages.
U.S. Office Action (Final) in U.S. Appl. No. 15/342,416, dated Apr. 19, 2019, 14 pages.

* cited by examiner

TIME SERIES MESSAGING PERSISTENCE AND PUBLICATION

BACKGROUND

Various types of messaging architectures may be used to communicate information between processes executing on a same computing device or on different computing devices. In an event-driven, micro-service based architecture, messages may be sent to cause a receiving service to behave in a predetermined manner. In many such architectures, the messages that are transferred may not be persisted as part of the messaging infrastructure, and the messaging infrastructure may be limited to message delivery. In such instances, the various message-consuming processes may be required to handle the incoming messages at whatever frequency they are sent, and may not be able to access previously sent messages once their initial handling is complete.

SUMMARY

Implementations of the present disclosure are generally directed to a messaging service. More specifically, implementations are directed to adding time series information to a set of messages to be persisted in data storage, and publishing (e.g., replaying) the set of messages on a consumer device using the time series information.

In general, innovative aspects of the subject matter described in this specification can be embodied in methods that include actions of: responsive to receiving messages, providing the messages as a time series by incorporating timing data into each of the messages; storing the time series of the messages on at least one data storage device; receiving a request for the messages from a consumer device; and responsive to the request, retrieving the messages from the at least one storage device and communicating the time series of the messages in a flow instance to the consumer device.

Implementations can optionally include one or more of the following features: the time series of the messages is communicated to present data of the messages in a user interface on the consumer device, the data presented in a time order according to the time series of the messages; the actions further include determining a flow configuration for the flow instance, the flow configuration describing at least one of a speed or a time direction; the actions further include communicating the time series of the messages in the flow instance to the consumer device according to the flow configuration; determining the flow configuration includes receiving the flow configuration from a flow instance controller executing on the consumer device; the actions further include receiving a modified flow configuration from the flow instance controller executing on the consumer device, the modified flow configuration describing at least one of a modified speed or a modified time direction; the actions further include communicating the time series of the messages in the flow instance to the consumer device according to the modified flow configuration; the timing data is a timestamp indicating at least one of a time or a date when each respective message is received; the timing data is an offset indicating a time difference between receipt of each respective message and receipt of a first message in the time series of messages; the actions further include receiving a second request for the messages from a second consumer device; the actions further include responsive to the second request, retrieving the messages from the at least one storage device and communicating the time series of the messages in a second flow instance to the second consumer device, at least in part contemporaneously with the communicating of the time series of the messages in the flow instance to the consumer device; the actions further include receiving a second request for a second set of messages from the consumer device; and/or the actions further include responsive to the second request, retrieving the second set of messages from the at least one storage device and communicating a time series of the second set of messages in a second flow instance to the consumer device, at least in part contemporaneously with the communicating of the time series of the messages in the flow instance to the consumer device.

Implementations provide various technical advantages and improvements over traditional systems. As described further below, implementations provide for replay of flow(s), interaction with message consumer, enrichment with time data, multiple (e.g., simultaneous) instances of message flows, simulation and modification of message flows, persistency, and in some instances transparency for message consumers. In traditional messaging services, the messages that are being transferred not be saved as part of the messaging infrastructure, and the messaging infrastructure may only handle the delivery of the messages. In some traditional messaging services, a message may be persisted by the messaging infrastructure, but the message may be deleted from storage after it is consumed by a recipient. Traditional messaging architectures may fail to take into account a time parameter, and thus all messages may be processed and distributed by the messaging infrastructure in real-time. Moreover, access (e.g., repeatable access) to the message data may not be available in a traditional messaging infrastructure. For these reasons, a traditional messaging infrastructure may not allow the replaying of a previously handled sequence of messages, such as messages that were initially received and/or sent one day, one hour, or one week earlier.

To accommodate these shortcomings of traditional messaging infrastructures, message consuming applications that employ such infrastructures have been required to handle persistency, retrieval, and/or replaying of messages themselves, if at all. Adding message persistency, retrieval, and replay features to individual message consuming applications adds development cost and complexity to the applications, and has the potential to introduce bugs and/or performance issues to the applications. Adding such features to applications also leads to greater consumption of processing capacity, memory, storage space, network capacity, and/or other computing resources. Implementations provide a messaging infrastructure that incorporates timing information into sequences of messages that are persisted in data storage, allowing the time sequences of messages to be provided (e.g., in time order) for replay on one or more consumer devices. Accordingly, implementations provide more efficient use of computing resources such as memory, storage, processing capacity, and network bandwidth on computing devices that execute message consuming applications, compared to traditional systems.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
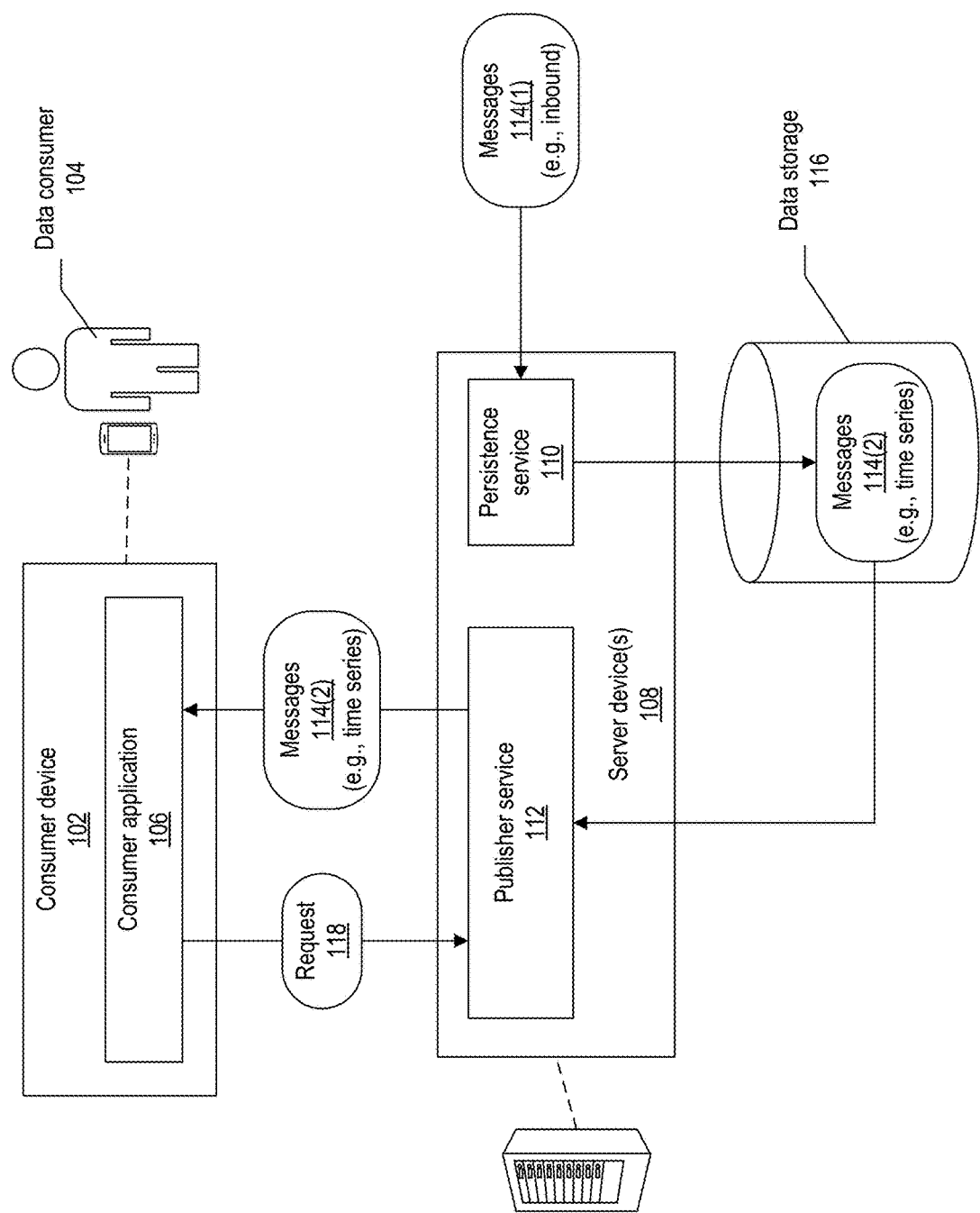
FIG. 1 depicts an example system for time series messaging persistence and publication, according to implementations of the present disclosure.

Implementations of the present disclosure are directed to systems, devices, methods, and computer-readable media for time series based enrichment of messages that are persisted and published in a flow according to the time series data. Inbound messages may be received, and timing information may be added to the inbound messages. For example, each message may be modified to include a timestamp indicating a date and/or time when the message was received. The modified messages may be stored as a time series in data storage. In response for a request for a particular sequence or set of messages, the messages may be retrieved from data storage and provided in a flow instance to the requestor. The requestor, such as a consumer application, may replay the data from the messages according to the order of the time series of the messages. In this way, implementations enable a time ordered sequence of messages to be replayed at any time after the initial receipt of the messages, and enable any number of instances of such replay including simultaneous replay of a particular message sequence to multiple consumers.

Messaging principles are widely used today to enable event-driven and/or micro-services based architectures. In traditional messaging services, the messages that are being transferred not be saved as part of the messaging infrastructure, and the messaging infrastructure may only handle the delivery of the messages. In some traditional messaging services, a message may be persisted by the messaging infrastructure, but the message may be deleted from storage after it is consumed by a recipient. Traditional messaging architectures may fail to take into account a time parameter, and thus all messages may be processed and distributed by the messaging infrastructure in real-time. Moreover, access (e.g., repeatable access) to the message data may not be available in a traditional messaging infrastructure. For these reasons, a traditional messaging infrastructure may not allow the replaying of a previously handled sequence of messages, such as messages that were initially received and/or sent one day, one hour, or one week earlier.

To accommodate these shortcomings of traditional messaging infrastructures, message consuming applications that employ such infrastructures have been required to handle persistency, retrieval, and/or replaying of messages themselves, if at all. Adding message persistency, retrieval, and replay features to individual message consuming applications adds development cost and complexity to the applications, and has the potential to introduce bugs and/or performance issues to the applications. Adding such features to applications also leads to greater consumption of processing capacity, memory, storage space, network capacity, and/or other computing resources. Implementations provide a messaging infrastructure that incorporates timing information into sequences of messages that are persisted in data storage, allowing the time sequences of messages to be provided (e.g., in time order) for replay on one or more consumer devices.

Implementations incorporate timing information into messages to enable the replay of a time series of the messages on one or more consumer devices. Implementations support the use of messages that include any suitable type of data for which timing is significant in some way. For example, a sequence of messages may indicate the price of a stock traded on a stock exchange over the course of a trading day. Adding timing information to such messages may enable a later replay of the messages, in their originally received order, to reproduce the time variation of the stock price days at a later time (e.g., days, weeks, months later, etc.).

Another use case is recording and replaying the positions of the various players in a sporting event, such as a football match. Through the use of cameras or other sensors, a match may be monitored and the positions of the players may be determined at each of a plurality of times during the match. The position information at each time may be communicated in a message. Accordingly, a message may include any number of (e.g., 22) key value pairs, where the key is a player identifier (e.g., name) and the value is the position of the player on the field, such as X and Y coordinates. As messages are received, timing information may be added in the form of a timestamp (e.g., date and/or time in absolute terms) or a timing offset from a starting time (e.g., the match clock, indicating a time from 0 to 90 minutes). The timing enriched messages may be stored and later retrieved and replayed for one or more users. For example, a consumer application may receive a time ordered flow of the sequence of messages, extract the position information from each message, and present the position information in a user interface (UI), thus enabling the consumer application to replay the match for a user by presenting the positions of the players over the course of the match. In some instances, the consumer application may present the data as if the match was live, even though the match may have been played and/or completed prior to replay of the position message data. As another use case, messages may include binary data such as image data. For example, images may be periodically captured during a bicycle ride using a camera affixed to a helmet. The images may be sent and replayed to enable the view of the ride to be replayed later.

FIG. 1 depicts an example system for time series messaging persistence and publication, according to implementations of the present disclosure. As shown in the example of FIG. 1, a consumer device 102 may be owned by, operated by, or otherwise associated with a data consumer 104 (e.g., a user or end-user). The consumer device 102 may be any suitable type of computing device, including a portable computing device (e.g., smartphone, tablet computer, wearable computer, etc.) or a less portable computing device (e.g., desktop computer, laptop computer, etc.). The consumer device 102 may execute a consumer application 106.

The system may also include one or more server devices 108 that are able to communicate with the consumer device 102 over one or more networks. The server device(s) 108 may include any suitable number and/or type of computing devices, such as distributing computing device(s) (e.g., cloud computing server(s)). The server device(s) 108 may execute a persistence service 110 and a publisher service 112. The system may also include data storage 116. The data storage 116 may include any suitable number and type of data storage devices. The data storage 116 may store any appropriate amount of data using any suitable data storage format or system. The data storage 116 may employ relational and/or non-relational data storage systems. In some implementations, the data storage 116 may employ an in-memory, column-oriented, relational database management system (RDBMS) such as a version of the HANA™ RDBMS developed by SAP SE™. The data storage 116 may be described as "Big Data", and may be capable of storing a large quantity of data of any suitable type and format.

In some implementations, the persistence service 110 may receive inbound messages 114(1). The persistence service 110 may modify (e.g., enrich, enhance) the messages 114(1) by adding timing information into one or more of the messages 114(1). In some implementations, the timing information may be a timestamp that indicates a date and/or time when the respective message 114(1) was received or otherwise processed by the persistence service 110. In some examples, the timestamp may be an absolute date and/or time with respect to an acknowledged calendar and/or time system. For example, the timestamp may indicate one or more of a year, a month, a day of the month, a day of the year, an hour of the day, a minute of the hour, a second of the minute, and/or a fraction of a second. The timestamp may indicate date and/or time to any suitable degree of specificity, such as milliseconds. In some implementations, a timestamp may be formatted according to the ISO 8601 standard for timestamps.

In some implementations, the timing information may be a time difference, offset, and/or delta relative to a reference time. For example, a first message 114(1) received in a sequence may be given an initial time (e.g., time=0) and each subsequent message 114(1) may be given timing information relative to the initial time, e.g., the time difference between the receipt of the initial message and the receipt of the subsequent message. In some instances, where the messages are sent and/or received with a consistent frequency (e.g., one message per second), the timing information may be ordering information. For example, a first message may be modified to including timing information 0, a second message may be given timing information 1, a third message may be given timing information 2, and so forth. Implementations also support other appropriate formats for the timing information that is added to the messages 114(1).

The modified messages 114(1) with the added timing information may be stored in the data storage 116 as messages 114(2), e.g., as a time series of the messages. In response to a request 118 for the messages 114(2) from the consumer application 106, the publisher server 112 may retrieve the messages 114(2) from the data storage 116 and communicate the messages 114(2) to the consumer application 106. In some instances, multiple consumer applications 106 and/or consumers may consume the messages 114(2). The messages 114(2) may be communicated to the consumer application 106 in an order and with a timing according to the timing information in the messages 114(2). Accordingly, the time series of the messages 114(2) may be communicated to the consumer application 106 according to the original timing of the received messages 114(1), to enable the consumer application to replay the messages 114(1) on the consumer device 102 as they were originally received.

Figure 2:
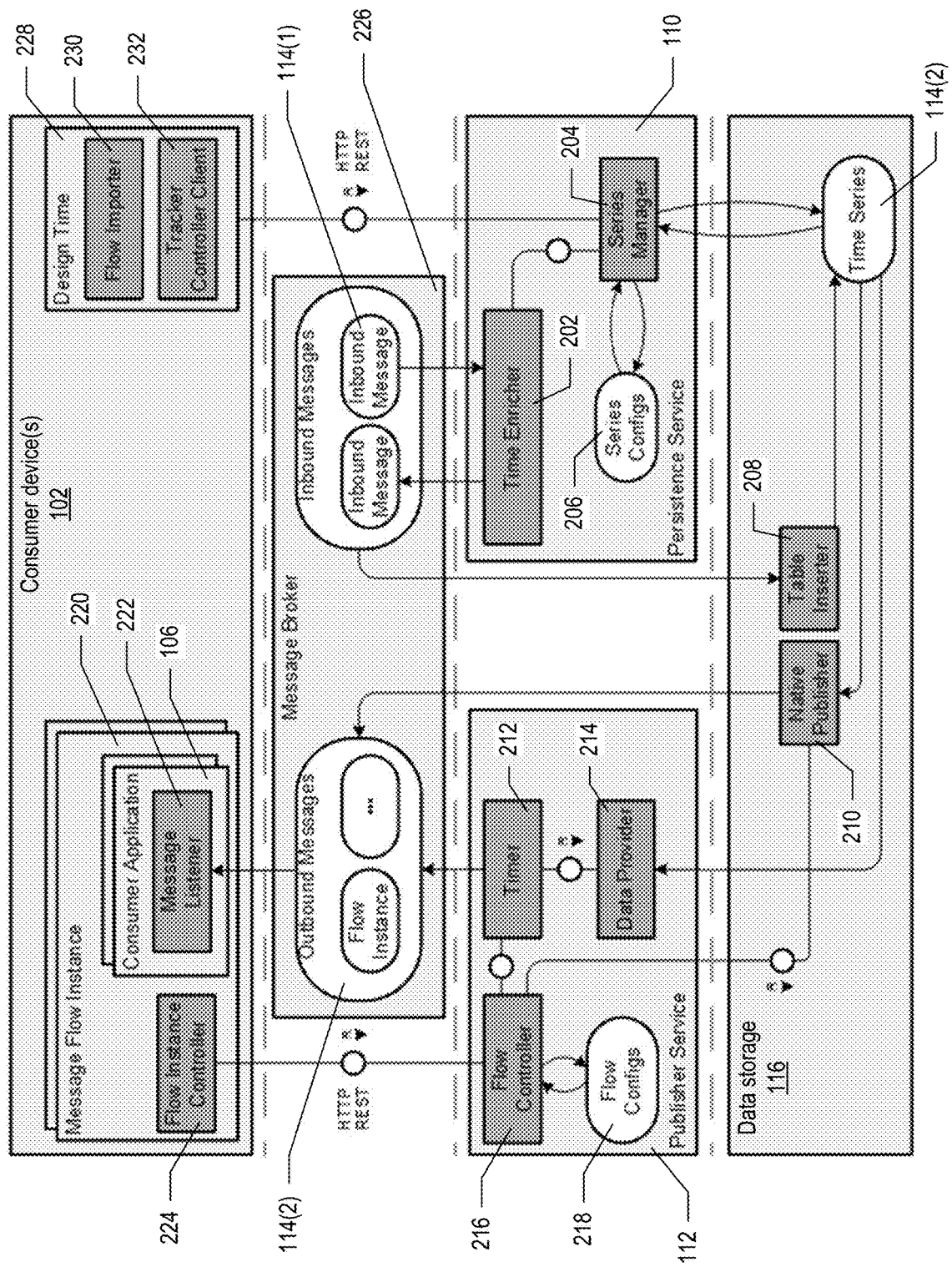
FIG. 2 depicts an example system for time series messaging persistence and publication, according to implementations of the present disclosure.

FIG. 2 depicts an example system for time series messaging persistence and publication, according to implementations of the present disclosure. FIG. 2 presents a somewhat more detailed example of the system of FIG. 1. Elements of FIG. 2 may be configured similarly to like-numbered elements of FIG. 1, and/or may perform operations that are somewhat similar to those performed by like-numbered elements of FIG. 1.

As described above, the persistence service 110 may handle the storing of inbound messages 114(1) in the data storage 116. The persistence service 110 may include a time enricher 202 and a series manager 204. The time enricher 202 may receive the inbound messages 114(1) and enrich them with timing information. In some implementations, the time enricher 202 may operate as a queue and listen for inbound messages 114(1), enriching each message 114(1) with timing information as the message 114(1) is received. In some instances, the time enricher 202 may provide the time-enhanced messages 114(2) to a table inserter 208 of the data storage 116, and the table inserter 208 may insert the messages 114(2) as a time series into the data storage 116. In examples where the data storage 116 is a HANA™ data storage system, the table inserter 208 may be the HANA™ table inserter.

In some instances, the series manager 204 of the persistence service 110 may insert a whole series or sequence of the messages 114(2) as a time series into the data storage 116. For example, a set of messages 114(2) for a particular football match (as in the example above) may be inserted as a time series. The series manager 204 may access series configurations 206 (e.g., series configs) to insert a series of messages 114(2). The series configuration 206 may define a series as a set of messages 114 that are related to each other in some way, such as messages of a particular topic, messages from a particular source, and/or messages that received during a particular time period. For example, the series configuration 206 may indicate that messages with the topic "Bayern Munich vs. Barcelona" that are received from the source "Champions League" during a particular time period (e.g., May 6, 2015) are to be included in a series for the 6 May 2015 Bayern Munich vs. Barcelona match. The series configuration may also specify that a particular frequency and/or sampling rate of inbound messages 114(1) is to be enhanced with timing information (e.g., every fourth message). In some implementations, each series and/or time sequence of messages 114 may be given an identifier (ID)

that uniquely identifies that set of messages among multiple sets of messages stored in the data storage 116.

In some implementations, messages 114 may also be imported into the data storage 116 from external services, and such imported messages may also have a time series dimension. Implementations may consume any suitable set of recorded messages from a third party. The table inserter 208 may listen at one or more queues of inbound messages, e.g., time enriched messages 114 from the time enricher and/or third party provider(s), and insert the messages 114 into the data storage 116.

In some implementations, the consumer device(s) 102 may execute one or more design time modules 228, such as a flow importer 230 that enables a user to specify configuration information for third party messages to be imported to the data storage 116 as a message flow. The design time module(s) 228 may also provide an option to delete a series from the data storage 116. The design time module(s) 228 may also include a tracker controller client 232. The tracker controller client 232 may provide the design time tool for the recording and enrichment of a flow. A user can configure how they want to track particular messages which are published to a set of configured topics over a given time period. For example, the user may configure how they want to record soccer or football data such as player positions, events, and so forth for a particular game such as Bayern Munich vs. Barca on a particular data and/or time. In some implementations, the tracker controller client 232 may be used to configure aspects for the time enricher, such as a timestamp, time offset, and so forth.

In some implementations, the data storage 116 may include a native publisher 210 to retrieve and output the stored time series messages 114(2) to various requesting processes. In some instances, the native publisher 210 may be implemented natively for better performance compared to non-native implementations. In some instances, the native publisher 210 may retrieve and output messages 114(2) (e.g., directly) to a consumer application 106 execute on a consumer device 102, e.g., with no additional service acting as an intermediary. In some instances, the messages 114(2) may be retrieved and provided by the publisher service 112 instead of or in addition to being provided by the native publisher 210. The publisher service 112 may include a timer 212, a data provider 214, and a flow controller 216.

The various consumer device(s) 102 may support any suitable number of message flow instances 220, and each message flow instance 220 may receive a flow of a time series of messages 114(2) from the data storage 116 and/or the publisher service 112. In some examples, a message flow instance 220 may include a consumer application 106, or a consumer application 106 may include a message flow instance 220. A consumer application 106 and/or message flow instance 220 may include a message listener 222 and/or a flow instance controller 224. In some implementations, the flow instance controller 224 may be included as a set of features in the consumer application 106. Inclusion of the flow instance controller 224 in the consumer application 106 may be optional depending on whether the publisher service is transparent for the consumer application 106.

In some instances, the time series data is the raw data receiving from the originator of the messages. A message flow, or flow, may be described as a replay of a given time series. A flow request may indicate, to the publisher service, when to publish data from a time series and how to publish the data. For example, the request may indicate that the service is to publish data from particular starting date and/or time to a particular ending date and/or time, and to publish every second message, include a delay or increase of speed, or other characteristics of the flow. A message flow instance can be controlled by the client application, e.g., to speed up or slow down the message flow. In some scenarios a flow instance can be started by the consumer application and/or by the publisher service based on a particular start and/or stop time, regardless of whether the consumers are aware of the publisher service or not.

The process for playing back a series of messages 114 may be initiated by a data consumer 104 employing a consumer application 106 to send a request 118 for a series of messages 114 to be replayed on the consumer application 106. The request 118 may be sent by the flow instance controller 224 to the flow controller 216 of the publisher service 112. The flow controller 216 may provide various parameters for the outbound flow of messages 114, such as a start time, the speed for replaying the messages 114, the play direction (e.g., backwards or forwards), and so forth. In some instances, the data consumer 104 may use various controls of the consumer application 106 to set parameters for playback speed, direction, to pause the playback, and so forth, and such parameters may be included in the request 118 to the flow controller 216. The request 118 may also identify the series to be provided.

In response to the request 118, the publisher service may start a timer 212 that keeps time according to the timing information specified in the parameters (e.g., the playback speed). The data provider 214 may retrieve the requested messages 114 from the data storage 116 according to the timing provided by the timer 212. When the playback speed changes, e.g., based on a fast forward command received from the consumer application 106 via the flow instance controller 224, the flow controller 216 may receive an indication of the timing change, and instruct the timer 212 to change its timing accordingly. If the flow controller 216 receives a pause command from the flow instance controller 224, e.g., in response to a pause command entered through the consumer application 106, the flow controller 216 may instruct the timer 212 to pause, thus pausing the retrieval and playback of messages 114 on the consumer application 106.

The data provider 214 may retrieve messages 114 and provide them to the timer 212, which may publish the messages 114 to the message listener 222 of the consumer application 106 according to the current time interval. In some implementations, the data provider is implemented natively (e.g., in SQL). In instances where the native publisher 210 retrieves and provides the messages 114 to the consumer application 106, the flow controller 216 may instruct the native publisher 210 to retrieve and/or publish the messages 114 according to the current timing parameters. The flow controller 216 may access flow configurations 218 (flow configs) to control the various flow(s) of outbound messages 114. The flow configuration 218 may store current configuration information for a flow, such as the flow speed, current location in the flow (e.g., the time of the current, most recent, and/or next message 114 to be published in the flow), and/or other parameters. The flow configuration 218 may also store the state of a flow, such as whether the flow is currently paused, a pointer to a corresponding time series, a start and/or stop time, and so forth.

In some implementations, the inbound messages 114(1) and/or outbound messages 114(2) may be received and/or published through a message broker 226, which may execute on the server device(s) 108 or elsewhere. Implementations may employ any suitable message broker 226, that operates as a publication and/or subscription broker. In some instances, the client application may employ various protocols to process messages, such as Java Message Service (JMS), MQ Telemetry Transport (MQTT), or others. In one example, JMS may be used for message processing and the message broker 226 may be the broker provided by Solace Systems™.

Implementations support the use of any number of flow instances being active at any given time, with each flow instance publishing a series of messages 114 to a message listener 222 and/or consumer application 106. Different flow instances may publish different time series of messages 114 to different message listeners 222, different consumer applications 106, and/or different data consumers 104. Different flow instances may publish the same time series of messages 114 to different message listeners 222, different consumer applications 106, and/or different data consumers 104. Different flow instances may have a different flow configuration, including different playback speeds, different current locations in the flow, and so forth. Accordingly, each flow instance may operate independently of other flow instances to publish a time series of messages 114 to a message listener 222.

As shown in the example of FIG. 2, the design time module(s) 228 may interact with the series manager 204 through a RESTful interface, such as through Hypertext Transfer Protocol (HTTP) messages (e.g., requests and/or responses). In some implementations, the flow instance controller 224 may interact with the flow controller 216 through a RESTful interface, such as through HTTP messages. In some implementations, a single publisher service 112 may provide multiple flow instances. Alternatively, each flow instance may be provided by a different instance of a publisher service 112 executing on the server device(s) 108.

The message listener 222 may receive the messages 114 published within a flow instance, and may process the received messages 114 appropriately. In some examples, the message listener 222 may be included in a consumer application 106, and the consumer application 106 may present data from the received messages 114 in a UI.

In some implementations, multiple series of related messages 114, and/or multiple queues of related messages 114, may be provided in a same flow or may be provided simultaneously in different flows to a same message listener 222. For example, following the soccer match use scenario, of series of messages 114 may be provided for game information such as player positions, ball position, and so forth. One or more other series of messages 114 may be provided for commentary, fan information, traffic data, parking information, concessions status, and so forth. Such related series of messages 114 may be grouped and/or processed together as a logical unit in some implementations. Such a super-set of queues may be related to a particular topic, and different queues in the super-sets may describes different aspects of the overall topic.

In implementations where the data storage 116 is a SAP HANA™ data storage, the table inserter 208 may provide an interface from a messaging infrastructure into the SAP HANA™ data storage. The data storage 116 may provide a high-volume persistence database, and messaging-as-a-service may be provided as a cloud-based messaging infrastructure. Implementations allow the addition of timing information (e.g., a time parameter) to messages and the persistence of the time information enhanced messages into SAP HANA™ data storage, or any other suitable type of big data storage system. In some examples, the persisting of the time-enhanced messages may be performed without any awareness of the original message provider that is sending messages via the messaging infrastructure and the messaging persistence service.

In some instances, the messages may be originally sent for a particular purpose (e.g., to provide play-by-play information for a sports match), and the persistence service 110 may automatically intercept, time-enhance, and store the messages for later retrieval and replay as requested by data consumers 104. A consumer application 106 may later request messages from the messaging infrastructure, where such messages have been enhanced with timing information as described herein. The messaging infrastructure may then retrieve the messages from SAP HANA™ or any other suitable (e.g., big data) storage solution, and the retrieved messages may be published in a flow instance via the messaging infrastructure. Such publication may provide a replay of the messages that is the same, or similar, in order and timing compared to the initially received flow of messages, but later in time and in some cases over a different time interval (e.g., replayed at a slower or faster speed).

Figure 3:
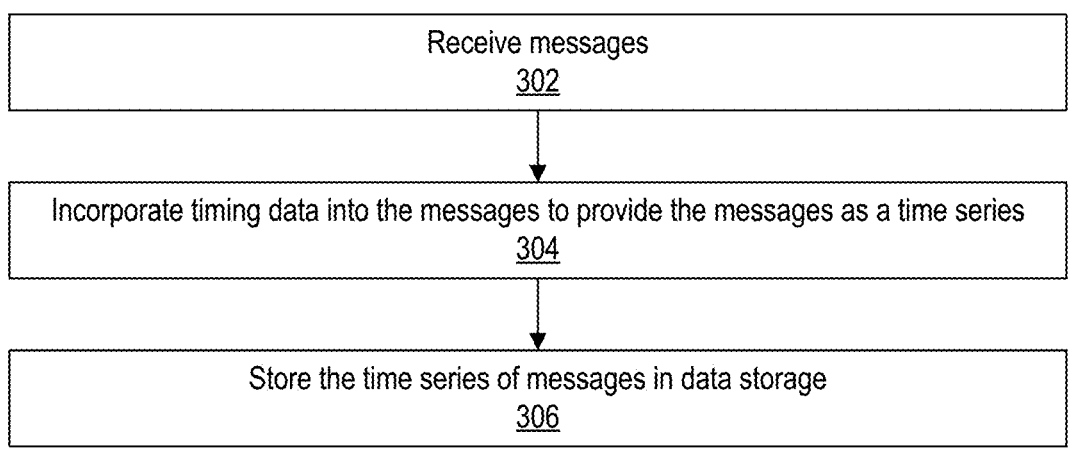
FIG. 3 depicts a flow diagram of an example process for receiving and enriching messages with time series data, according to implementations of the present disclosure.

FIG. 3 depicts a flow diagram of an example process for receiving and enriching messages with time series data, according to implementations of the present disclosure. Operations of the process may be performed by one or more of the persistence service 110, the publisher service 112, the consumer application 106, the time enricher 202, the series manager 204, the table inserter 208, the native publisher 210, the timer 212, the data provider 214, the flow controller 216, the message listener 222, the flow instance controller 224, and/or other software modules executing on the consumer device(s) 102, the server device(s) 108, the data storage 116, or elsewhere.

The inbound messages 114(1) may be received (302) as described above. In some examples, the inbound messages 114(1) may not already include any sort of timing information. Timing information may be incorporated (304) into one or more of the messages 114(1) to provide messages 114(2), e.g., time-enriched messages. The time-enriched messages 114(2) may then be persisted (e.g., stored) in the data storage 116 (306). In some implementations, each of the inbound messages may be time-enhanced and persisted. In some implementations, a subset of the messages (e.g., every tenth message) may be time-enhanced and persisted according to a frequency and/or sampling rate specified by the series configuration 206.

Figure 4:
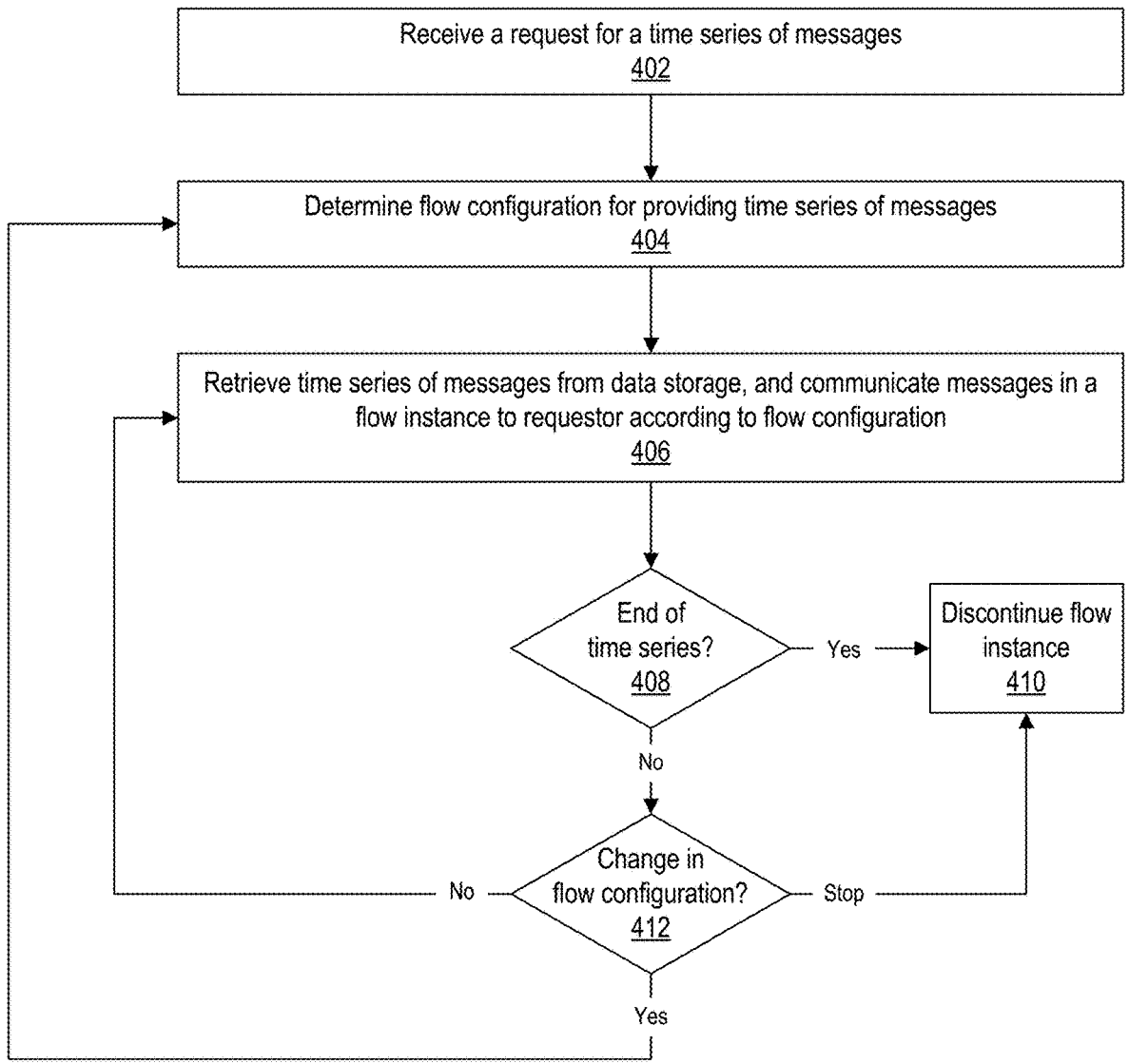
FIG. 4 depicts a flow diagram of an example process for providing messages enriched with time series data, according to implementations of the present disclosure.

FIG. 4 depicts a flow diagram of an example process for providing messages enriched with time series data, according to implementations of the present disclosure. Operations of the process may be performed by one or more of the persistence service 110, the publisher service 112, the consumer application 106, the time enricher 202, the series manager 204, the table inserter 208, the native publisher 210, the timer 212, the data provider 214, the flow controller 216, the message listener 222, the flow instance controller 224, and/or other software modules executing on the consumer device(s) 102, the server device(s) 108, the data storage 116, or elsewhere.

A request 118 may be received (402) for a time series of messages 114. As described above, the request may be received from a consumer application 106 and/or flow instance controller 224 executing on a consumer device 102. The flow configuration 218 may be determined (404) for a flow instance to publish the requested time series of messages 114. In some instances, the flow instance controller 224 may specify flow configuration information with the request 118. In some implementations, default flow configuration information may be initially used to establish the flow instance. The requested time series of messages 114 may be retrieved (406) from data storage 116 and communicated to the requestor in a flow instance according to the flow configuration, as described above.

During the use of the flow instance to publish the time series of messages 114, a check may be performed to determine (408) whether the end of the time series has been reached. If so, the flow instance may be discontinued (410). If the end has not been reached, a check may be performed to determine (412) whether a change has been made to the flow configuration, such as a change of playback timing and/or playback direction, a pause command, and so forth. If so, the process may return to 404 and determine the new flow configuration, and process with the playback based on the new flow configuration. If not, the process may return to 406 and continue playback based on the current flow configuration. In instances where the change in flow configuration is a command to stop the flow, the flow instance may be discontinued (410).

Figure 5A:
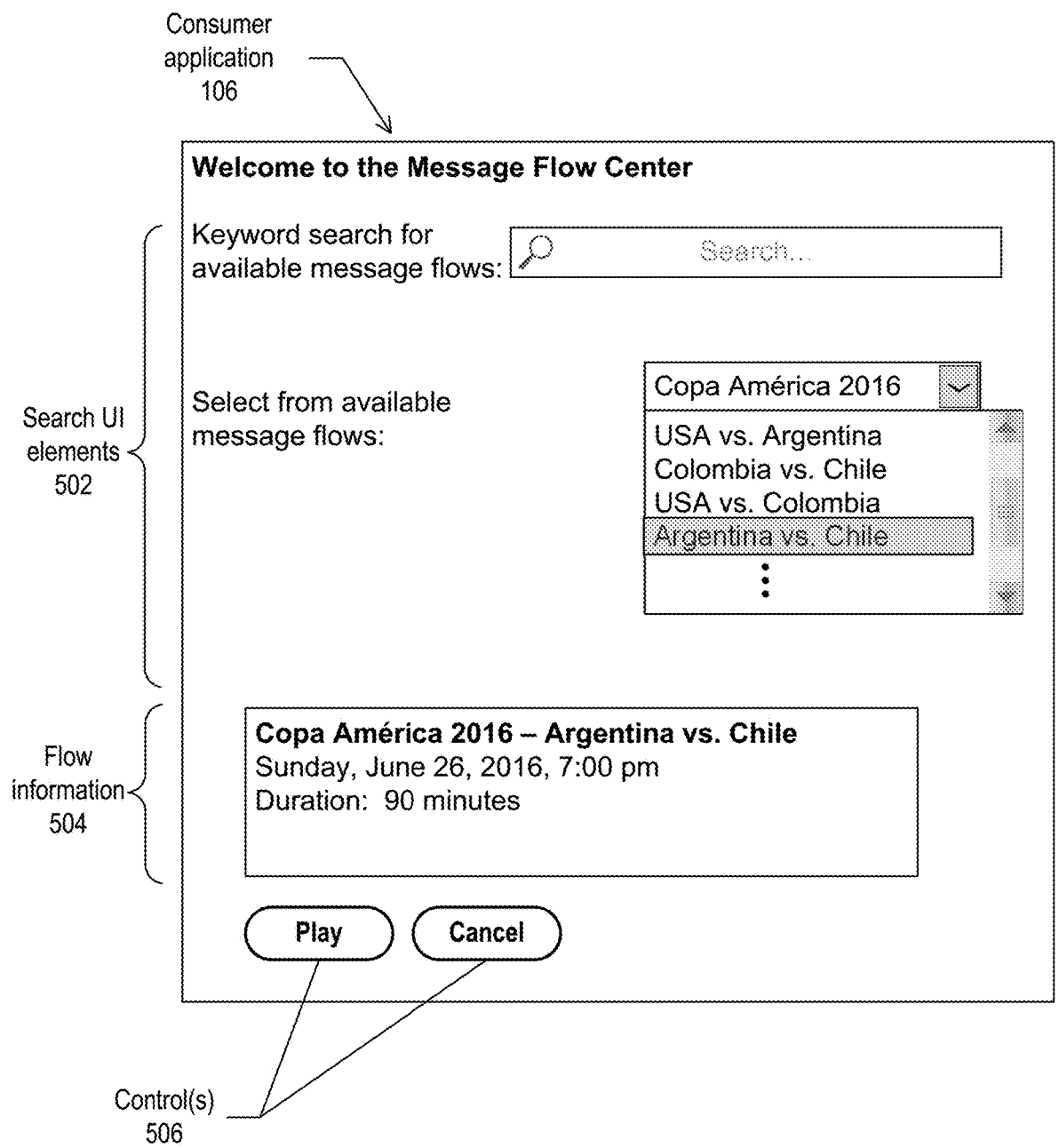
FIGS. 5A-5C depict example user interfaces for providing messages enriched with time series data, according to implementations of the present disclosure.
Figure 5C:
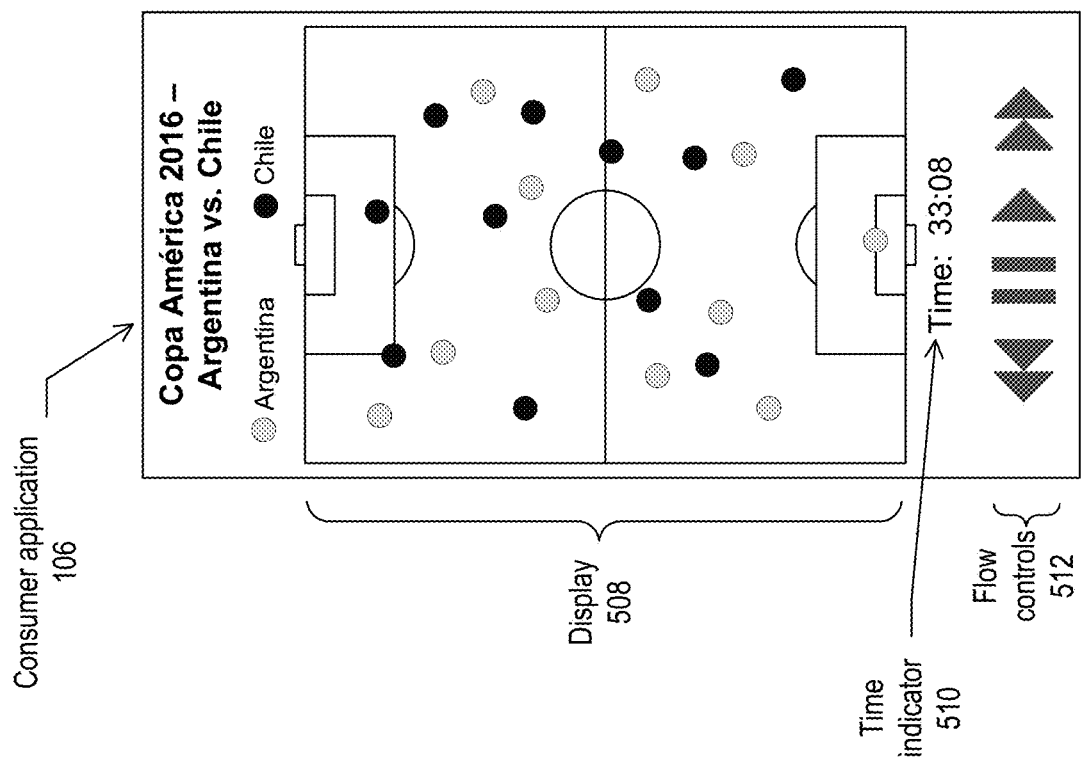
Figure 5B:
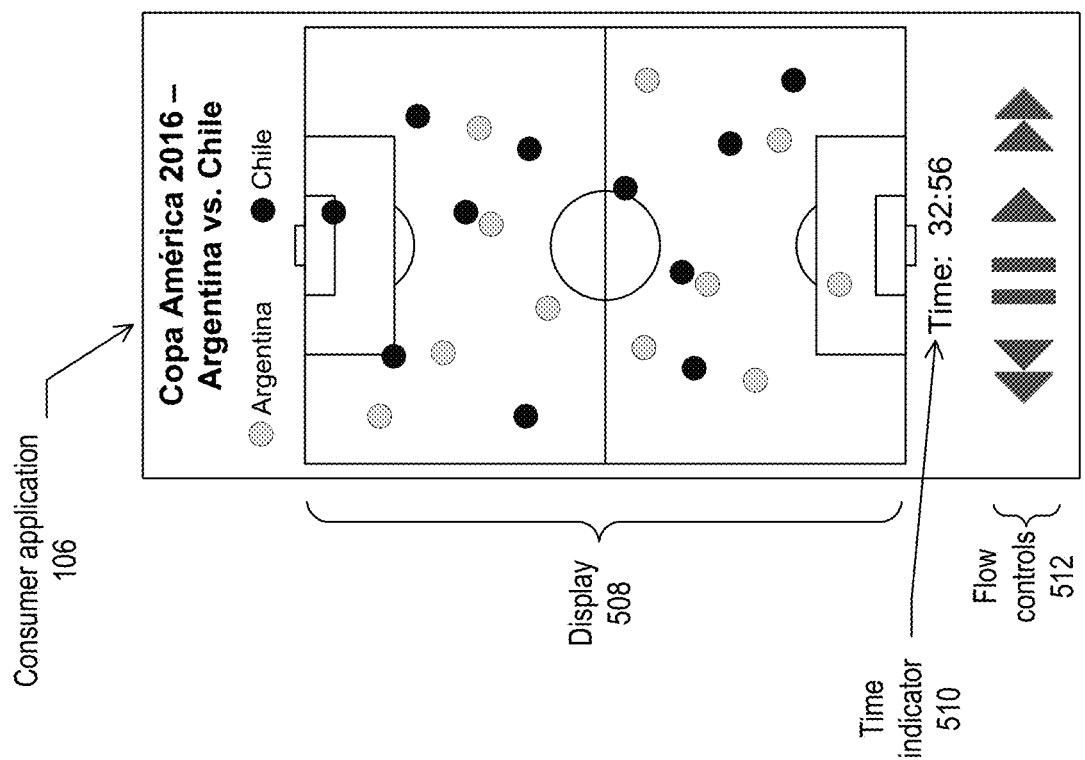

FIGS. 5A-5C depict example UIs for providing messages enriched with time series data, according to implementations of the present disclosure. In some examples, the depicted UIs may be presented within the consumer application 106 executing on the consumer device(s) 102.

In FIG. 5A, a UI is depicted that enables a data consumer 104 may select a message flow to be replayed through the consumer application 106. The UI may include one or more search UI elements 502 that enable the data consumer 104 to search for available message flows. Such elements 504 may include a search box to entering search terms. The data consumer 104 may then click or otherwise gesture on a search button to request a search based on the provided terms. The terms may include any number of words, phrases, and/or other text strings. In some examples, the terms may include multiple terms related through Boolean operators (e.g., AND, OR, etc.). The elements 502 may also enable a data consumer 104 to search from available topics, types, and/or categories of flows. In the example of FIG. 5A, the data consumer 104 is searching for available message flows related to a topic of "Copa América 2016." The UI has presented a set of football matches related to the topic. In response to the data consumer 104 selecting one of the available message flows (e.g., "Argentina vs. Chile"), the UI may present flow information 504 describing the selected message flow. The data consumer 104 may employ control(s) 506 of the UI to request that the selected message flow be replayed, or to cancel the selection and begin searching again.

FIGS. 5B and 5C depict an example UI in which a message flow is being played back. In this particular example, the flow being replayed describes player information during a soccer match. Implementations also support other types of messages that convey other types of data. The UI may include a display 508 that presents the X-Y coordinates of the players of each team on a football pitch at a given time indicated by the time indicator 510. The UI may also include flow controls 512 that enable a data consumer 104 to change the playback speed (e.g., fast forward, slow playback, etc.), the playback direction (e.g., backwards or forwards), pause the playback, stop the playback, and or provide other commands to change the flow configuration. In the examples shown, FIG. 5B presents the player positions at a first time in a match (e.g., at 32:56) and FIG. 5C presents the player positions at a second time in the match (e.g., at 33:08). By replaying the time series of messages and presenting player positions at different times, the UI may effectively provide a graphic animation of player positions as the match progresses.

Figure 6:
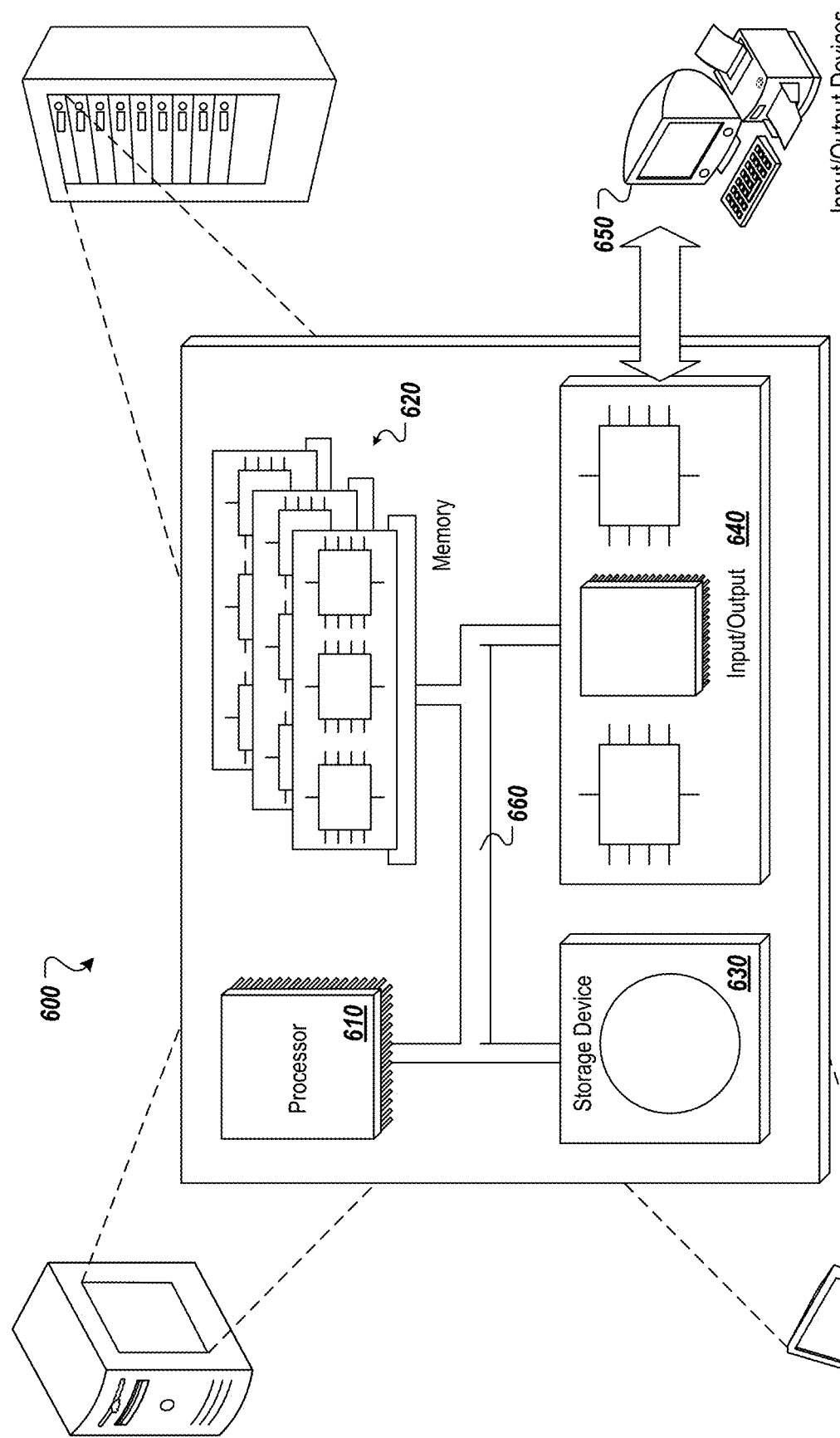
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more of the consumer device(s) 102, the server device(s) 108, the data storage 116, and/or other computing device(s) or systems of device(s) described herein. The system 600 may include one or more processors 610, a memory 620, one or more storage devices 630, and one or more input/output (I/O) devices 650 controllable through one or more I/O interfaces 640. The various components 610, 620, 630, 640, or 650 may be interconnected through at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed at a server and by at least one processor, the method comprising:
    receiving, by the at least one processor, a plurality of messages associated with a topic, wherein each of the messages describes, for each respective individual of a plurality of individuals, a set of coordinates for a position of the respective individual;
    enriching, by the at least one processor, a subset of the messages with timing data from the server that indicates when the respective message was received, wherein the messages to be enriched are selected from the received messages at a predetermined interval based on a particular sampling rate defined in a series configuration file;
    generating, by the at least one processor, a time series based on the enriched messages;
    storing, by the at least one processor, the time series of the enriched messages on at least one data storage device;
    receiving, by the at least one processor, a request for the plurality of messages from a consumer device; and
    responsive to the request, retrieving, by the at least one processor, the enriched messages from the at least one storage device and communicating the time series of the enriched messages in a flow instance to the consumer device to cause the consumer device to present, based on the set of coordinates for each of the individuals, a graphic animation of the position of each of the individuals over a time period that is at least partly included in a range of the timing data incorporated into the enriched messages.

2. The method of claim 1, wherein the time series of the enriched messages is communicated to display data of the plurality of messages in the graphic animation in a user interface on the consumer device, the data displayed in a time order according to the time series of the enriched messages.

3. The method of claim 1, further comprising:
- determining, by the at least one processor, a flow configuration for the flow instance, the flow configuration describing at least one of a speed or a time direction; and
- communicating, by the at least one processor, the time series of the enriched messages in the flow instance to the consumer device according to the flow configuration.

4. The method of claim 3, wherein determining the flow configuration includes receiving the flow configuration from a flow instance controller executing on the consumer device.

5. The method of claim 4, further comprising:
- receiving, by the at least one processor, a modified flow configuration from the flow instance controller executing on the consumer device, the modified flow configuration describing at least one of a modified speed or a modified time direction; and
- communicating, by the at least one processor, the time series of the enriched messages in the flow instance to the consumer device according to the modified flow configuration.

6. The method of claim 1, wherein the timing data is a timestamp indicating at least one of a time or a date when each respective message is received.

7. The method of claim 1, wherein the timing data is an offset indicating a time difference between receipt of each respective message and receipt of a first message in the time series of the enriched messages.

8. The method of claim 1, further comprising:
- receiving, by the at least one processor, a second request for the plurality of messages from a second consumer device; and
- responsive to the second request, retrieving, by the at least one processor, the plurality of messages from the at least one storage device and communicating the time series of the enriched messages in a second flow instance to the second consumer device, at least in part contemporaneously with the communicating of the time series of the enriched messages in the flow instance to the consumer device.

9. The method of claim 1, further comprising:
- receiving, by the at least one processor, a second request for a second set of messages from the consumer device; and
- responsive to the second request, retrieving, by the at least one processor, the second set of messages from the at least one storage device and communicating a time series of the second set of messages in a second flow instance to the consumer device, at least in part contemporaneously with the communicating of the time series of the enriched messages in the flow instance to the consumer device.

10. A system, comprising:
- at least one processor; and
- a memory communicatively coupled to the at least one processor, the memory storing instructions which, when executed at a server and by the at least one processor, cause the at least one processor to perform operations comprising:
  - receiving a plurality of messages associated with a topic, wherein each of the messages describes, for each respective individual of a plurality of individuals, a set of coordinates for a position of the respective individual;
  - enriching, by the at least one processor, a subset of the messages with timing data from the server that indicates when the respective message was received, wherein the messages to be enriched are selected from the received messages at a predetermined interval based on a particular sampling rate defined in a series configuration file;
  - generating a time series based on the enriched messages;
  - storing the time series of the enriched messages on at least one data storage device;
  - receiving a request for the plurality of messages from a consumer device; and
  - responsive to the request, retrieving the enriched messages from the at least one storage device and communicating the time series of the enriched messages in a flow instance to the consumer device to cause the consumer device to present, based on the set of coordinates for each of the individuals, a graphic animation of the position of each of the individuals over a time period that is at least partly included in a range of the timing data incorporated into the enriched messages.

11. The system of claim 10, wherein the time series of the enriched messages is communicated to display data of the plurality of messages in the graphic animation in a user interface on the consumer device, the data displayed in a time order according to the time series of the enriched messages.

12. The system of claim 10, the operations further comprising:
- determining a flow configuration for the flow instance, the flow configuration describing at least one of a speed or a time direction; and
- communicating the time series of the enriched messages in the flow instance to the consumer device according to the flow configuration.

13. The system of claim 12, wherein determining the flow configuration includes receiving the flow configuration from a flow instance controller executing on the consumer device.

14. The system of claim 13, the operations further comprising:
- receiving a modified flow configuration from the flow instance controller executing on the consumer device, the modified flow configuration describing at least one of a modified speed or a modified time direction; and
- communicating the time series of the enriched messages in the flow instance to the consumer device according to the modified flow configuration.

15. The system of claim 10, wherein the timing data is a timestamp indicating at least one of a time or a date when each respective message is received.

16. One or more non-transitory computer-readable media storing instructions which, when executed by at least one processor and at a server, cause the at least one processor to perform operations comprising:
- receiving a plurality of messages associated with a topic, wherein each of the messages describes, for each respective individual of a plurality of individuals, a set of coordinates for a position of the respective individual;
- enriching, by the at least one processor, a subset of the messages with timing data from the server that indicates when the respective message was received, wherein the messages to be enriched are selected from the received messages at a predetermined interval based on a particular sampling rate defined in a series configuration file;

generating a time series based on the enriched messages;

storing the time series of the enriched messages on at least one data storage device;

receiving a request for the plurality of messages from a consumer device; and responsive to the request, retrieving the enriched messages from the at least one storage device and communicating the time series of the enriched messages in a flow instance to the consumer device to cause the consumer device to present, based on the set of coordinates for each of the individuals, a graphic animation of the position of each of the individuals over a time period that is at least partly included in a range of the timing data incorporated into the enriched messages.

17. The one or more non-transitory computer-readable media of claim 16, wherein the timing data is a timestamp indicating at least one of a time or a date when each respective message is received.

18. The one or more non-transitory computer-readable media of claim 16, wherein the timing data is an offset indicating a time difference between receipt of each respective message and receipt of a first message in the time series of the enriched messages.

19. The one or more non-transitory computer-readable media of claim 16, the operations further comprising:

receiving a second request for the plurality of messages from a second consumer device; and responsive to the second request, retrieving the plurality of messages from the at least one storage device and communicating the time series of the enriched messages in a second flow instance to the second consumer device, at least in part contemporaneously with the communicating of the time series of the enriched messages in the flow instance to the consumer device.

20. The one or more non-transitory computer-readable media of claim 16, operations further comprising:

receiving a second request for a second set of messages from the consumer device; and responsive to the second request, retrieving the second set of messages from the at least one storage device and communicating a time series of the second set of messages in a second flow instance to the consumer device, at least in part contemporaneously with the communicating of the time series of the enriched messages in the flow instance to the consumer device.

* * * * *